(12) United States Patent
Peterson

(10) Patent No.: US 8,892,372 B2
(45) Date of Patent: Nov. 18, 2014

(54) ESTIMATING FLUID LEVELS IN A PROGRESSING CAVITY PUMP SYSTEM

(75) Inventor: Ronald G. Peterson, Racine, WI (US)

(73) Assignee: Unico, Inc., Franksville, WI (US)

( * ) Notice: Subject to any disclaimer, the term of this patent is extended or adjusted under 35 U.S.C. 154(b) by 376 days.

(21) Appl. No.: 13/182,506

(22) Filed: Jul. 14, 2011

(65) Prior Publication Data

US 2013/0018605 A1 Jan. 17, 2013

(51) Int. Cl.
| | | |
|---|---|---|
| *E21B 47/04* | (2012.01) | |
| *F04B 49/00* | (2006.01) | |
| *E21B 47/00* | (2012.01) | |
| *G01F 23/00* | (2006.01) | |
| *G01F 25/00* | (2006.01) | |
| *G01F 23/22* | (2006.01) | |

(52) U.S. Cl.
CPC ........ *E21B 47/0007* (2013.01); *G01F 25/0061* (2013.01); *G01F 23/0076* (2013.01); *G01F 23/22* (2013.01); *E21B 47/042* (2013.01)
USPC ................ 702/55; 702/182; 417/36; 417/42; 417/44.1; 73/290 R

(58) Field of Classification Search
USPC ......................................................... 702/55
See application file for complete search history.

(56) References Cited

U.S. PATENT DOCUMENTS

| | | |
|---|---|---|
| 3,343,409 A | 9/1967 | Gibbs |
| 3,585,484 A | 6/1971 | Dortort |
| 3,851,995 A | 12/1974 | Mills |
| 3,854,846 A | 12/1974 | Douglas |
| 3,915,225 A | 10/1975 | Swink |
| 3,918,843 A | 11/1975 | Douglas et al. |
| 3,930,752 A | 1/1976 | Douglas |
| 3,936,231 A | 2/1976 | Douglas |
| 3,938,910 A | 2/1976 | Douglas |
| 3,951,209 A | 4/1976 | Gibbs |
| 3,963,374 A | 6/1976 | Sullivan |
| 3,965,983 A | 6/1976 | Watson |
| 3,998,568 A | 12/1976 | Hynd |
| 4,058,757 A | 11/1977 | Welton et al. |

(Continued)

FOREIGN PATENT DOCUMENTS

WO    WO 2011083167 A1 * 7/2011

OTHER PUBLICATIONS

PCT Search Report from PCT/US2012/038161 issued Nov. 23, 2012.

(Continued)

*Primary Examiner* — Eliseo Ramos Feliciano
*Assistant Examiner* — Terence Stifter, Jr.
(74) *Attorney, Agent, or Firm* — Reinhart Boerner Van Deuren s.c.

(57) ABSTRACT

A method and apparatus for operating a pumping system includes the following: determining a motor operating parameter of a motor configured to drive a pump in a well; determining a pump operating parameter of the pump based on the motor operating parameter; operating the pump in a first mode to determine pump characteristics at a desired fluid level; generating first mode output data based on operation of the pump in the first mode; operating the pump in a second mode based on the first mode output data; determining an estimated fluid level in the well based on the motor operating parameter, the pump operating parameter and the first mode output data; and adjusting the pump speed based on the estimated fluid level in order to maintain a desired fluid level.

23 Claims, 9 Drawing Sheets

(56) References Cited

U.S. PATENT DOCUMENTS

| | | |
|---|---|---|
| 4,102,394 A | 7/1978 | Botts |
| 4,118,148 A | 10/1978 | Allen |
| 4,145,161 A | 3/1979 | Skinner |
| 4,171,185 A | 10/1979 | Duke et al. |
| 4,194,393 A | 3/1980 | Boley |
| 4,220,440 A | 9/1980 | Taylor et al. |
| 4,286,925 A | 9/1981 | Standish |
| 4,363,605 A | 12/1982 | Mills |
| 4,390,321 A | 6/1983 | Langlois et al. |
| 4,406,122 A | 9/1983 | McDuffie |
| 4,438,628 A | 3/1984 | Creamer |
| 4,474,002 A | 10/1984 | Perry |
| 4,476,418 A | 10/1984 | Werner |
| 4,480,960 A | 11/1984 | Streib |
| 4,483,188 A | 11/1984 | McTamaney et al. |
| 4,487,061 A | 12/1984 | McTamaney et al. |
| 4,490,094 A | 12/1984 | Gibbs |
| 4,507,055 A | 3/1985 | Fair et al. |
| 4,508,487 A | 4/1985 | Taylor et al. |
| 4,508,488 A | 4/1985 | Pikna |
| 4,509,901 A | 4/1985 | McTamaney et al. |
| 4,534,168 A | 8/1985 | Brantly |
| 4,534,706 A | 8/1985 | Palm et al. |
| 4,541,274 A | 9/1985 | Purcupile |
| 4,583,915 A | 4/1986 | Montgomery et al. |
| 4,594,665 A | 6/1986 | Chandra et al. |
| 4,631,954 A | 12/1986 | Mills |
| 4,661,751 A | 4/1987 | Werner |
| 4,681,167 A | 7/1987 | Soderberg |
| 4,695,779 A | 9/1987 | Yates |
| 4,741,397 A | 5/1988 | Weeks |
| 4,747,451 A | 5/1988 | Adams, Jr. et al. |
| 4,830,112 A | 5/1989 | Erickson |
| 4,859,151 A | 8/1989 | Reed |
| 4,873,635 A | 10/1989 | Mills |
| 4,935,685 A | 6/1990 | Justus et al. |
| 4,971,522 A | 11/1990 | Butlin |
| 4,973,226 A | 11/1990 | McKee |
| 5,006,044 A | 4/1991 | Walker, Sr. et al. |
| 5,044,888 A | 9/1991 | Hester, II |
| 5,064,349 A | 11/1991 | Turner et al. |
| 5,129,264 A | 7/1992 | Lorenc |
| 5,129,267 A | 7/1992 | Nicholls |
| 5,167,490 A | 12/1992 | McKee et al. |
| 5,180,289 A | 1/1993 | Wenholz et al. |
| 5,204,595 A | 4/1993 | Opal et al. |
| 5,222,867 A | 6/1993 | Walker, Sr. et al. |
| 5,224,834 A | 7/1993 | Westerman et al. |
| 5,230,607 A | 7/1993 | Mann |
| 5,237,863 A | 8/1993 | Dunham |
| 5,246,076 A | 9/1993 | Watson |
| 5,251,696 A | 10/1993 | Boone et al. |
| 5,252,031 A | 10/1993 | Gibbs |
| 5,281,100 A | 1/1994 | Diederich |
| 5,284,422 A | 2/1994 | Turner et al. |
| 5,316,085 A | 5/1994 | Dawson |
| 5,318,409 A | 6/1994 | London et al. |
| 5,324,170 A | 6/1994 | Anastos et al. |
| 5,362,206 A | 11/1994 | Westerman et al. |
| 5,372,482 A | 12/1994 | London et al. |
| 5,425,623 A | 6/1995 | London et al. |
| 5,441,389 A | 8/1995 | Wolcott et al. |
| 5,444,609 A | 8/1995 | Swamy et al. |
| 5,458,466 A | 10/1995 | Mills |
| 5,634,522 A | 6/1997 | Hershberger |
| 5,819,849 A | 10/1998 | Booth |
| 5,820,350 A | 10/1998 | Mantey et al. |
| 5,823,262 A | 10/1998 | Dutton |
| 5,829,530 A | 11/1998 | Nolen |
| 5,868,029 A | 2/1999 | Paine |
| 5,941,305 A | 8/1999 | Thrasher et al. |
| 5,996,691 A | 12/1999 | Norris et al. |
| 6,021,377 A | 2/2000 | Dubinsky et al. |
| 6,041,856 A | 3/2000 | Thrasher et al. |
| 6,043,569 A | 3/2000 | Ferguson |
| 6,079,491 A | 6/2000 | Stuebinger et al. |
| 6,092,600 A | 7/2000 | McKinzie et al. |
| 6,127,743 A | 10/2000 | Levin et al. |
| 6,129,110 A | 10/2000 | Kolb |
| 6,155,347 A | 12/2000 | Mills |
| 6,176,682 B1 | 1/2001 | Mills |
| 6,244,831 B1 | 6/2001 | Kawabata et al. |
| 6,464,464 B2 | 10/2002 | Sabini et al. |
| 6,585,041 B2 | 7/2003 | Crossley |
| 6,683,428 B2 | 1/2004 | Pavlov et al. |
| 6,869,272 B2 | 3/2005 | Odachi et al. |
| 7,168,924 B2 | 1/2007 | Beck et al. |
| 7,321,211 B2 | 1/2008 | Peterson |
| 7,330,779 B2 | 2/2008 | Schulz |
| 7,437,215 B2 | 10/2008 | Anderson et al. |
| 7,668,694 B2 | 2/2010 | Anderson et al. |
| 2002/0074127 A1 | 6/2002 | Birckhead et al. |
| 2002/0162402 A1* | 11/2002 | Henyan ............ 73/861.71 |
| 2004/0062658 A1* | 4/2004 | Beck et al. ............ 417/42 |
| 2010/0150737 A1 | 6/2010 | Anderson et al. |

OTHER PUBLICATIONS

Gibbs, S.C.: "Predicting the Behavior of Sucker-Rod Pumping Systems," JPT (Jul. 1963, 769-78, Trans, AIME 228).

Garlow, M.E.: "Sensorless Estimation of a Sucker-Rod Pump Downhold Dynacard," Unico, Inc., Aug. 12, 2002.

Everitt, T.A. and Jennings, J.W.: "An Improved Finite-Difference Calculation of Downhold Dynamometer Cards for Sucker-Rod Pumps," Paper SPE 18189, SPE Production Engineering (Feb. 1992).

Jansen, P.L. and Lorenz, R.D.: "Accurary Limitations of Velocity and Flux Estimation in Direct Field Oriented Induction Machines," Power Electronics and Applications, 1993, Fifth European Conference on, 1993, 312-318, vol. 4.

Lorenz, R.D. and Lawson, D.B.: "A Simplified Approach to Continuous On-Line Tuning of Field-Oriented Induction Machine Drives," IEEE Transactions on Industry Applications, vol. 26, No. 3, May/Jun. 1990.

Hasan, A.R. and Kabir, C.S.: "Fluid Flow and Heat Transfer in Wellbores," Society of Petroleum Engineers, Richardson, TX, 2002.

* cited by examiner

ESTIMATING FLUID LEVELS IN A PROGRESSING CAVITY PUMP SYSTEM

FIELD OF THE INVENTION

This invention generally relates to a pumping system and, more particularly, to a method and system for estimating and controlling a fluid level in a wellbore with a pumping system.

BACKGROUND

Pumps are generally used to transport fluids at a desired flow and pressure from one location to another or, alternatively, to recirculate fluid in a system. Examples of such applications include, but are not limited to: oil wells, gas wells, water wells, irrigation systems, heating and cooling systems, wastewater treatment systems, municipal water treatment systems, distribution systems, and the like. Various operating parameters of the pump may be controlled to protect the pump from damage, optimize operation of the pump, increase pump efficiency, and/or increase fluid production. Examples of pump operating parameters include, for example, pump speed, pump torque, fluid flow rate, pump input pressure, and pump output pressure.

One or more sensors may be used inside the wellbore or "downhole" to measure pump operating parameters directly. In many applications, the placement required for the sensors is inconvenient or difficult to access and may require that the sensors be exposed to a harmful environment, thereby decreasing system reliability. Additionally, sensor installation and maintenance costs add to the overall cost of the pumping system. Still further, replacing or repairing the sensors may require that pump operations be suspended. Therefore, installation, operation, and maintenance costs may be reduced, and overall pump system productivity and reliability may be improved by eliminating the placement of sensors inside the well.

SUMMARY

In one embodiment, there is provided a method of determining an estimated fluid level in a wellbore, without an in-well sensor, including a progressing cavity pump disposed in the wellbore. The pump is coupled to an electric motor and a controller. The method includes steps of determining an operating parameter of the electric motor and determining an operating parameter of the pump. An additional step includes recording in a look-up table associated with the controller at least one pump torque value at a specific pump speed value. The method also includes using the operating parameter of the electric motor, the operating parameter of the pump, and the look-up table values to determine with the controller an estimated fluid level in the wellbore as the pump is operated by the controller at a selected speed.

In another embodiment, a pumping system includes a pump configured to control a level of fluid in a well, and a motor operably coupled to the pump and configured to drive the pump. The pumping system further includes a controller, which includes a motor determination unit, a pump determination unit, a fluid level determination unit, a first mode unit, a second mode unit, and an adjustment unit. The motor determination unit determines a motor operating parameter, such as motor torque and motor speed. The pump determination unit determines a pump operating parameter based on at least one of the motor operating parameter. The fluid level determination unit determines an estimated fluid level in the well based on the motor operating parameter and the pump operating parameter. The first mode unit operates the pump in a first mode to generate first mode output data, including pump speed and torque values associated with specific fluid-over-pump values and stores such data in a mapping database, also referred to as a look-up table. The second mode unit operates the pump in a second mode with the torque and speed value of the pump compared to the pump torque and speed values in the mapping database. The adjustment unit adjusts the pump speed based on the estimated fluid level of the pump obtained in the second mode. The controller changes one of the motor operating parameter and the pump operating parameter to maintain the level of fluid in the well at a predetermined setpoint value.

In yet another embodiment, a pump controller includes a motor determination unit. The motor determination unit is configured to determine motor operating parameters of the motor configured to control a pump in a well. The motor operating parameters comprise motor torque and motor speed. A pump determination unit is operably coupled to the motor determination unit and is configured to determine pump operating parameters based on at least one motor operating parameter. The pump operating parameters include pump torque and pump speed. A fluid level determination unit is operably coupled to the pump determination unit and configured to determine an estimated fluid level in the well. The fluid determination unit includes a first mode unit configured to generate first mode output data based on operation of the pump in the first mode. Such data includes pump speed and pump torque values associated with specific fluid-over-pump values and storing such data in a mapping data base. The fluid determination unit further comprises a second mode unit operably coupled to the first mode unit, wherein the second mode unit is configured to operate the pump in a second mode to determine an estimated fluid level. The second mode unit uses current speed and torque values of the pump compared to the speed and pump torque values in the mapping data base. An adjustment unit is operably coupled to the fluid level determination unit. The adjustment unit is configured to adjust the pump speed to maintain estimated fluid level at a predetermined setpoint value.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION

Figure 1:
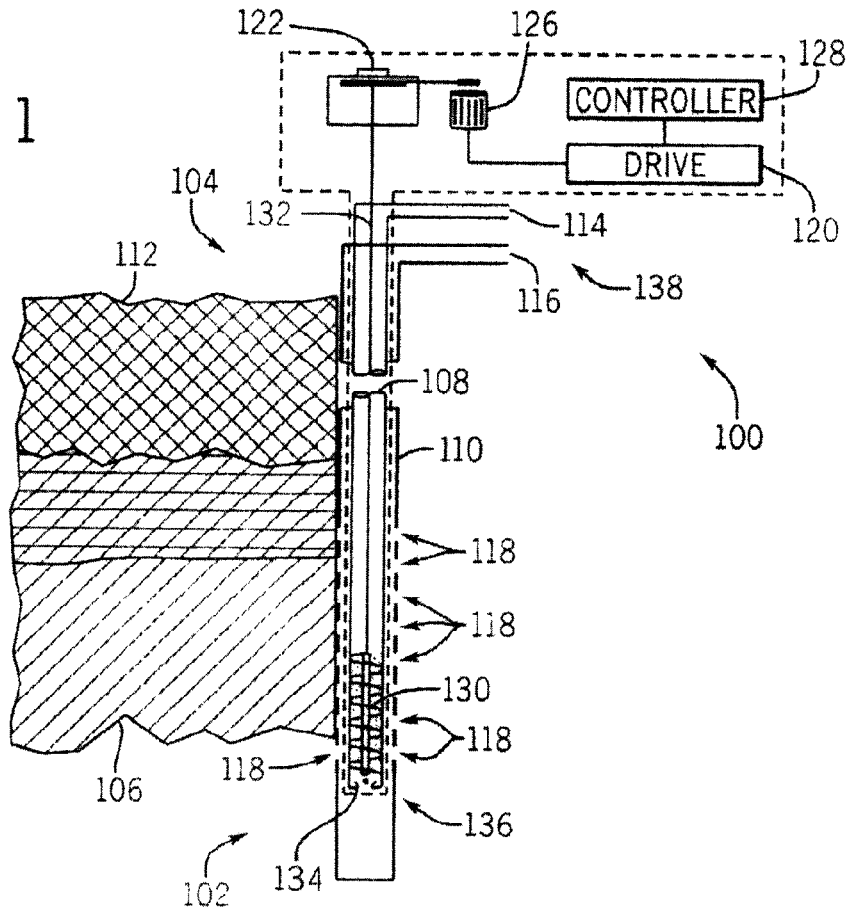
FIG. 1 is a partial representation of a well and an embodiment of a pumping system that controls operation of a pump as it is driven into the well.

Referring to FIG. 1, an embodiment of pumping system 100 that controls operation of a pump 102 as it is driven into a well 104 is shown. The well 104 shown in the embodiment of FIG. 1 is an oil well in which oil is extracted from an underground formation 106. It is to be understood, however, that the pumping system 100 may be operated in any other types of wells such as, for example, a gas well, a water well, and the like. The well 104 includes an inner production tubing 108 and an outer casing 110. As shown, the inner production tubing 108 which can extend from ground level 112 to below ground level includes a fluid outlet 114 located above ground level 112. In the embodiment shown in FIG. 1, the inner production tubing 108 extends approximately 1000 to 5000 feet or more below ground level 112. The bottom of the inner production tubing 108 generally terminates below the underground formation 106. The outer casing 110 includes a gas outlet 116 and a plurality of perforations 118 that allow oil in the underground formation 106 to enter the well bore. As shown in FIG. 1, the gas outlet 116 is located at an upper end of the outer casing 110 above ground level 112. It is to be understood that water can be combined with oil, and the pump 102 can be used for other liquids. The pump 102 can also be used to pump water only.

The pumping system 100 includes the pump 102, an electric drive system 120, a gearbox 122, a motor 126, and a controller 128. In some embodiments a gearbox will not be used. As shown in the embodiment of FIG. 1, the pump 102 is mounted at a lower end of the inner production tubing 108, and includes a pump member 130 coupled to a pump rod string 132. The pump rod string 132 extends axially through the inner production tubing 108 and is rotated by the gearbox 122 and motor 126 during a pumping operation.

In the embodiment of FIG. 1, the pump member 130 is a helix-type pump member 130 mounted inside the pump housing at the lower end of the inner production tubing 108. It is to be understood, however, that the pump member 130 may be any desired shape that allows the pump 102 to be rotationally driven below ground level 112. The pump 102 shown in FIG. 1 is a progressing cavity pump (PCP). An optional check valve 134 may be located either on the suction side 136 or the discharge side 138 of the pump 102 to reduce backflow of fluid when the pump 102 is not in operation.

The electric drive system 120 provides power for driving the motor 126. As an example, the electric drive system 120 may be a variable speed drive that includes an inverter to convert DC power to AC power for driving the motor 126. The gearbox 122 converts a motor torque and speed input to a suitable torque and speed output for driving the pump rod string 132 and pump member 130 coupled thereto. The pump rod string 132 is directly coupled to a shaft of the motor 126 or coupled through the gearbox 122 or similar speed reduction mechanism. During a pumping operation, the motor 126 rotates the pump rod string 132. In the embodiment of FIG. 1, the motor 126 is a three-phase AC induction motor designed to be operated from a line voltage in the range of about 230 VAC to 690 VAC, and which develops about 5 to 250 horsepower, depending upon the capacity and depth of the pump 102. It is to be understood, however, that other types and kinds of motors may be used such as, for example, a synchronous motor. Electrical power for the electric drive system 120 and the controller 128 may be obtained by rectifying incoming AC power from a utility provider or a generator.

The controller 128 controls the electric drive system 120. Specifically, the controller 128 sends commands to the electric drive system 120 to control the operation of the motor 126 and the pump 102 to maintain the fluid level within the well 104 at a desired fluid level. As will be described in greater detail below, the controller 128 located above ground level 112 is configured to monitor and control the operation of the pump 102 located below ground level 112 without the use of sensors located "downhole" or within the well 104. As the pump 102 is driven during a pumping operation, a fluid column stores potential energy due to the drive operation of the pump 102 moving the fluid in an upward direction, thus creating a back pressure at the output of the pump 102.

Figure 2:
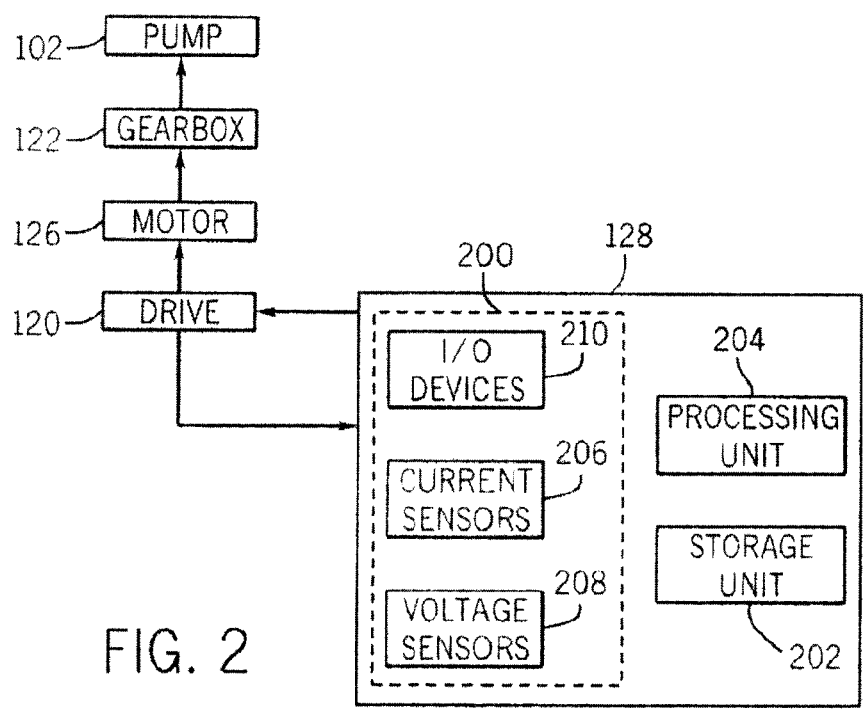
FIG. 2 is a detailed block diagram of an embodiment of a pump controller associated with the pumping system of FIG. 1.

Referring to FIG. 2, the controller 128 includes a motor interface unit 200, a processing device 204, and an associated data storage unit 202. The controller 128 monitors and controls pump operation to maintain a desired fluid level above the pump 102 and, thereby, prevent a pump off condition.

The motor interface unit 200 includes devices for interfacing the controller 128 with other components within the pumping system 100. Specifically, the motor interface unit 200 includes a current sensor 206, a voltage sensor 208, and an input/output (I/O) device 210. The current sensor 206 and the voltage sensor 208 are coupled to the motor 126 to sense motor current and motor voltage, respectively. In one embodiment, both of the current sensor 206 and the voltage sensor 208 include circuits coupled at the motor windings to obtain motor current, voltage, and flux measurements. It is to be understood that the current sensor 206 and the voltage sensor 208 may include other transducers and/or circuits configured to measure current and voltage values. The current sensor and voltage sensor are conventional electrical components and, therefore, their operation is not discussed further herein.

The controller 128 receives the sensed motor current and motor voltage values through a suitable input/output (I/O) device 210. The I/O device 210 may include a keyboard, removable media device, and an analog-to-digital converter to convert the analog measurements into a digital format suitable for use by the data storage unit 202 and the processing device 204 of the controller 128.

The data storage unit 202 may include devices that store programs, sensed motor parameters, and other data that are accessed by the processing device 204 to monitor and control operation of the pump 102. Specifically, the storage unit 202 may include volatile and/or nonvolatile memory such as, for example, RAM, ROM, EEPROM, flash, and the like. The storage unit 202 may include additional features and functionality. For example, the storage unit 202 may include removable and/or non-removable devices, including, but not limited to, magnetic or optical disks, tapes, and the like. As is known, computer storage media include volatile and nonvolatile, removable and non-removable media implemented in any method or technology for storage of information such as, for example, computer-readable instructions or routines, data structures, objects, components, and/or other data types.

The processing device 204 may include any type of computational device such as, for example, a personal computer (PC), laptop, portable data assistant, and the like.

Figure 3:
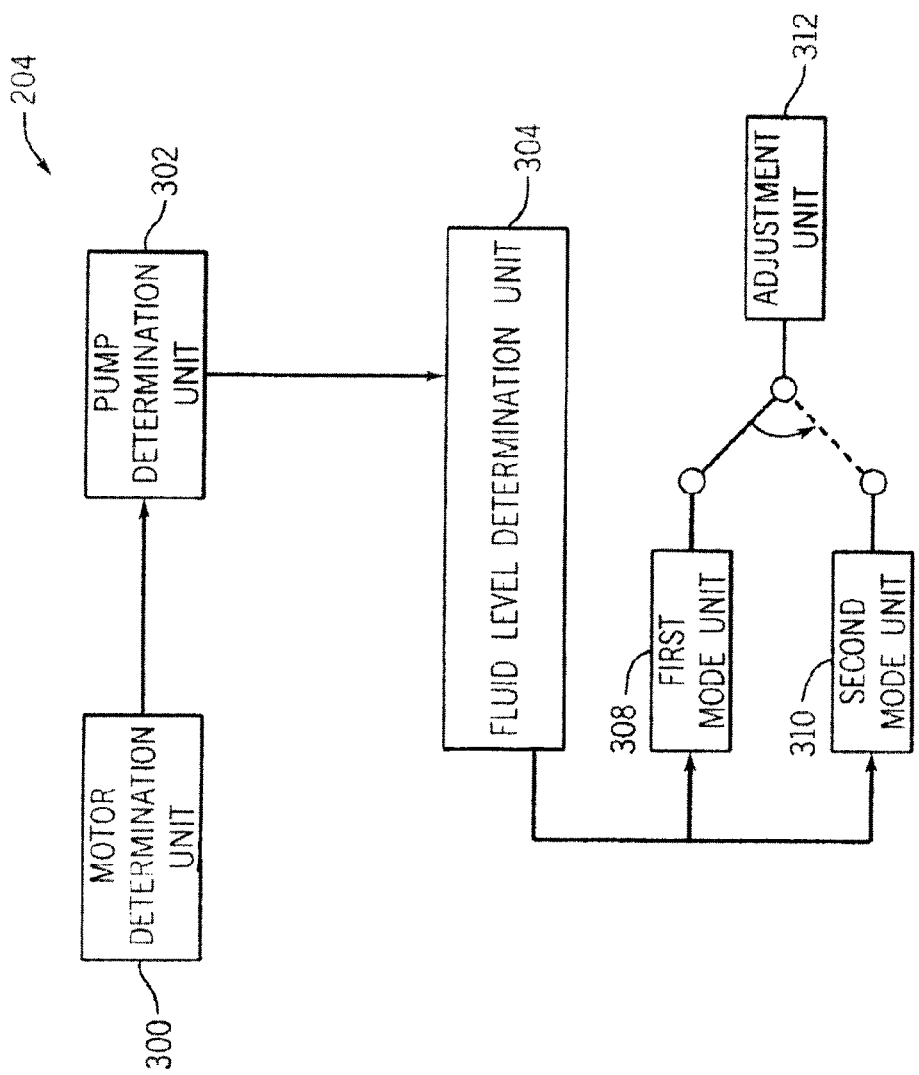
FIG. 3 is a detailed block diagram of various components of the pump controller of FIGS. 1 and 2.

Referring to FIG. 3, the processing device 204 includes a motor determination unit 300, a pump determination unit 302, a fluid level determination unit 304, a first mode unit 308, a second mode unit 310, and an adjustment unit 312. The adjustment unit 312 uses data obtained from the first mode unit 308 and the second mode unit 310 to control fluid level in the casing 110.

The fluid level estimate is determined in the fluid level determination unit 304 with input data obtained from operating the pump 102 during first mode operation. The two sets of data obtained from the first and second mode units, 308, 310 are used to estimate the fluid level in the well 104. (See FIGS. 9 and 10).

The pump 102 is operated in a first mode, also referred to an identification mode that calibrates the system 100. A first mode unit 308 (See FIG. 9) operates the pump 102 at different speeds (RPMs) with a known, measured value of fluid over pump (FOP). The FOP can be obtained in several ways, for example with an acoustic sounding apparatus. In one embodiment, the first mode unit 308 controls the speed and/or rotation of the pump 102 using a Proportional-Integral-Derivative (PID) function. The speed and torque of the pump 102 are measured at a variety of speeds to develop a mapping of speed to torque for a given FOP. In such procedure, the pump 102 is operated in a forward direction for all measurements.

The pump 102 can also be operated to determine an estimated friction value for the friction that occurs between moving parts during the pump operation. Specifically, the pump 102 operates in a direction opposite to the direction in which the pump 102 was operated in the identification mode. This reverse-direction rotation of the pump 102 is known as backspinning. By backspinning the pump 102 in a controlled manner, an estimated friction value may be determined, thereby resulting in an absolute measure of FOP, without the need for acoustic calibration.

The estimated friction values includes a pump coulomb friction value during operations of the pump 102.

Figure 10:
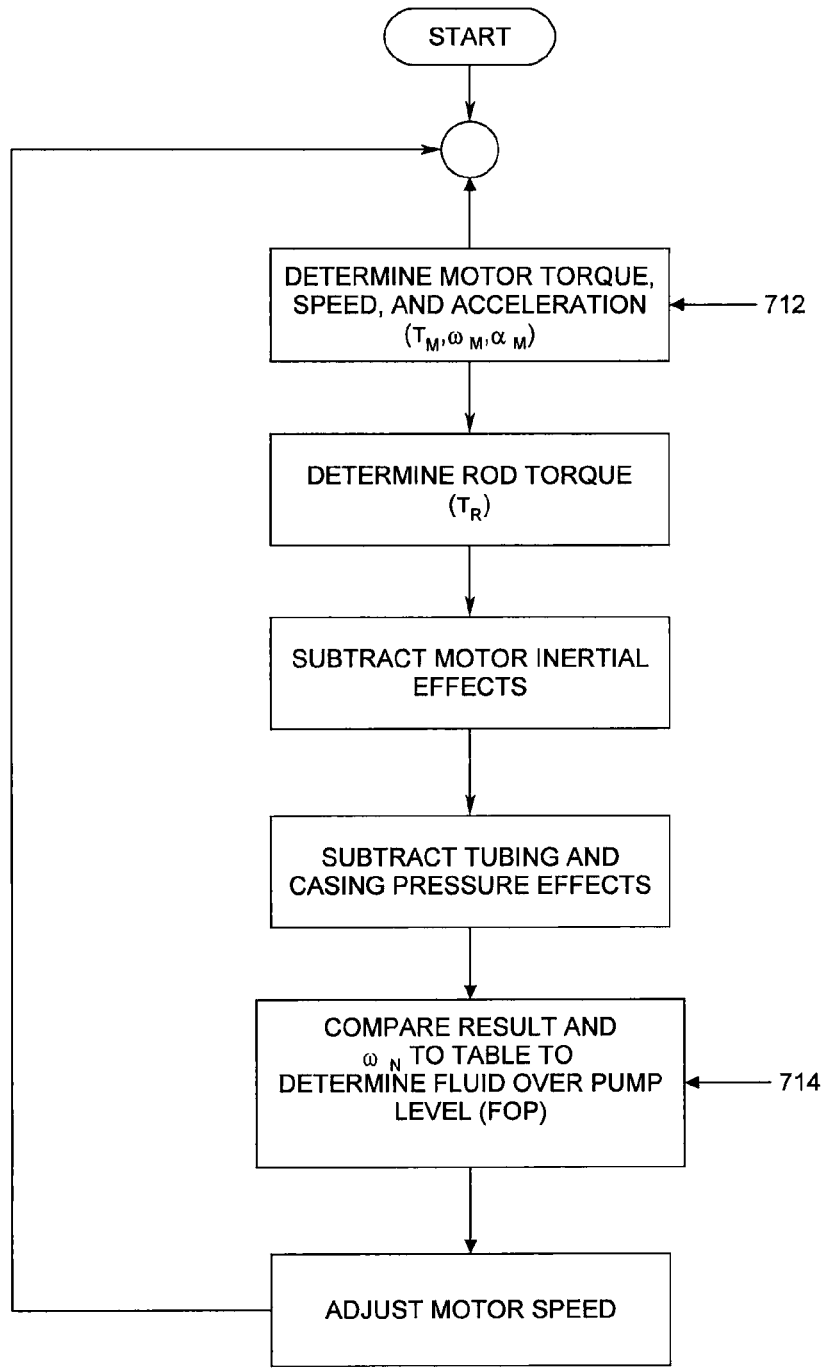
FIG. 10 is a flowchart schematic of a method implemented by the pump controller for Mode 2—Normal operation (Production).

The pump 102 is also operated in a second mode, also referred to as an operational mode (See FIG. 10). A second mode unit 310 operates the pump 102 in a production manner. The pump 102 operates to pump fluid in the well and the speed and torque of the pump 102 is measured by sensing the pump motor current and voltages with appropriate sensors (206, 208). The measured torque value is compared to the torque value for that sensed speed as contained in the mapping database obtained during the first mode operation. If the operating torque is lower than the torque value in the mapping database, it is assumed that the FOP has increased. Inversely, if the operating torque is higher than the torque value in the mapping database, it is assumed that the FOP has decreased. The FOP is calculated in the pump controller 128 using the measured torque value and the data in the mapping database.

The difference between the FOP estimate and the target setpoint value is calculated and the speed of the pump is adjusted by the adjustment unit 312, on a substantially real time basis, to control FOP to a predetermined target setpoint value. The target setpoint value is typically set as an input by an operator of the system 100 with the input/output device 210. "Substantially real time basis" means as quickly as can be determined by a user of the pump system 100.

Figure 9:
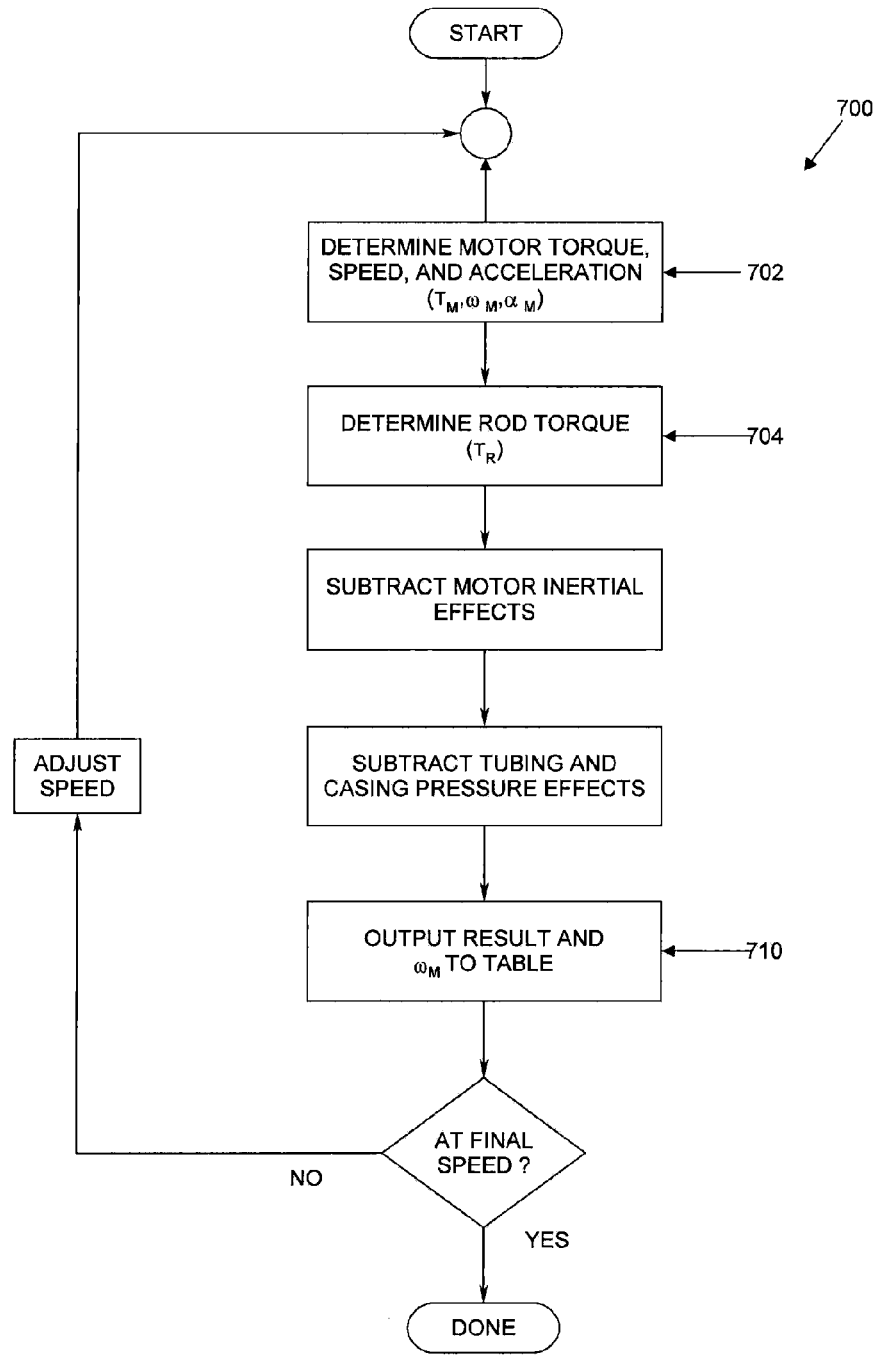
FIG. 9 is a flowchart schematic of one embodiment of a method implemented by the pump controller for Mode 1—Well to System Characterization.

Referring to FIG. 9, a flowchart of one embodiment of a first mode method 700 implemented by the pump controller 128 for operating the pumping system 100 is shown. At block 702, the pump controller 128 determines a motor operating parameter based on sensed parameters associated with the motor 126 located above ground level 112. For example, the pump controller 128 determines motor torque and speed values based on sensed measurements for motor current and motor voltage taken above ground level 112. Control then passes to block 704 in which the pump controller 128 determines a pump operating parameter such as rod torque based on the motor operating parameter. The pump operating parameter, in some circumstances, may include pump speed, pump torque, fluid flow rate, pump displacement, pump head pressure, pump suction pressure, pump discharge pressure, and the like. In one embodiment, the pump controller 128 determines pump speed and pump torque using a mathematical model of the components of the pumping system 100.

At block 710, the pump controller 128 generates first mode output data based on operation of the pump 102 in the first mode. First mode output data will include, pump speeds and pump torques as part of the lookup table.

Referring to FIG. 9, the pump controller 128 also generates second mode output data 714 based on operation of the pump 102 in the second mode. In block 712 the pump controller 128 operates the pump 102 in a second mode based on the first mode output data.

When the pumping system 100 is operated in the first mode, FIG. 9, the pump system 100 is obtaining characterization data for the pump system. Mode 1 is also referred to as "identification mode" that calibrates the system 100. In the first mode, the system is building a data table when the pump 102 is operated at different speeds with a known, measured value of fluid over pump (FOP). As indicated above, the FOP can be determined with an acoustical sensor operated at the well head. The speed and torque (702, 704) are measured at a variety of speeds to determine a mapping (data table) of speed to torque for a given FOP. In some situations, optionally determined by the operator, the pump is operated in a reverse direction to try to more accurately determine which component of pump torque is attributable to pump friction, thereby eliminating the need for calibration of FOP with a direct measuring device, such as an acoustic device.

When the pump system 100 is operated in the second mode, the pump 102 is operated in its normal condition also referred to as "operation mode" (FIG. 10). The speed and torque of the motor 126 are measured and the torque is compared to the torque in the data table obtained during the mode 1 calibration mode for the measured speed. If the operating torque is lower than the value of torque in the data table, the assumption is that the pump is lifting the fluid a lesser net distance. In other words the FOP has increased. Conversely, if the operating torque is higher than the value of torque in the data table, the assumption is that the pump is lifting the fluid a greater net distance. In other words the FOP has decreased. The increase or decrease in FOP is calculated and the speed of the pump is adjusted by the adjustment unit 312 to control the FOP to a target setpoint value. The target setpoint value of FOP is inputted by an operator of the pump system 100.

Although the processing device 204 and the storage unit 202 have been described as local devices associated with a single pump controller 128, it is to be understood that the controller 128 may include a plurality of processing devices and storage units distributed remotely to each other and configured to communicate via a wired or wireless communications network such as, for example, a local area network (LAN), a wide area network (WAN), a wireless communications network, and the like. Similarly, although the motor determination unit 300, the pump determination unit 302, the fluid level determination unit 304, the setpoint determination unit 306, the first mode unit 308, the second mode unit 310, and the adjustment unit 312 have been described as separate, discrete units of the processing device 202, the functionality of several or all of the units 300-312 may be combined if desired.

The processing device 204 includes mathematical models of various components of the pumping system 100 such as, for example, the drive system 120, the motor 126, the pump rod string 132, the pump 102, the inner production tubing 108, the outer casing 110, the fluid being pumped, the reservoir, and the like, to simulate pumping operation and generate output data. Models of the elements of the pumping system 100 are run in real time. As a result, the models may be used to detect and identify appropriate limits and enforce associated control strategies.

Additionally, the processing device 204 may also use component manufacturer specifications, information related to the well 104, and field setup parameters to monitor the operation of the pumping system 100. Still further, identification routines may be implemented by the processing device 204 to automatically determine installation-dependent system parameters associated with the motor 126, pump rod string 132, and pump 102. The models simulate the thermal, mechanical, electrical, and hydraulic behavior of the pumping system 100 to control the pumping process with greater precision.

The motor determination unit 300 determines a motor operating parameter of the motor 126. The motor operating parameter may include dynamic variables indicative of motor operation such as, for example, motor torque, speed, velocity, rotor angle, and the like. Specifically, the motor determination unit 300 receives the sensed parameters from the motor interface unit 200 (e.g., motor current and motor voltage), and determines corresponding motor torque and speed values. In one embodiment, the motor determination unit 300 determines motor torque by motor current and voltage signals generated by transducers coupled to the motor. Similarly, the motor determination unit 300 determines motor speed by appropriate transducers coupled to the motor. As a result of this self-sensing configuration, the motor determination unit 300 may determine nearly instantaneous estimates of motor torque and motor speed, for example, at a rate of approximately 1000 times per second.

The pump determination unit 302 determines a pump operating parameter associated with the pump 102 based on the motor operating parameter. The pump operating parameter typically includes pump speed and pump torque and the like.

The fluid level determination unit 304 determines an estimated fluid level in the well 104 based on measurements associated with the motor 126 obtained from above ground level 112. Specifically, the fluid level determination unit 304 eliminates the need to place a level sensor, strain gauge, or other flow sensor "downhole" or inside the well 104, which otherwise may require placement of the sensor hundreds or thousands of feet below ground level 112. Additionally, conditions inside the well 104 may not be favorable to the sensor, which may cause frequent sensor failures. As a result, the pumping operation may have to be suspended or halted to remove the pump 102 and associated piping so that the failed sensor can be accessed for repair or replacement. The fluid level determination unit 304 determines the estimated fluid level based on the motor operating parameter and the pump operating parameter, which are obtained from measurements taken above ground level 112 such as, for example, motor current and motor voltage.

Figure 4:
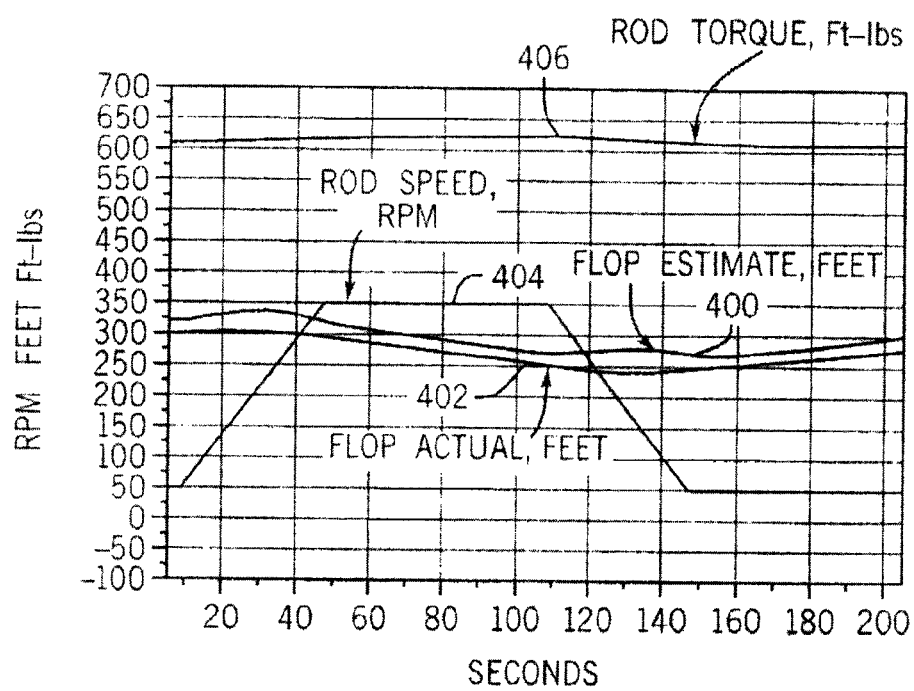
FIG. 4 is a graph illustrating waveforms that show an estimated fluid level and an actual fluid level, both as a function of various speed and torque conditions.

During mode one operation, the controller 128 ramps the motor 126 from maximum speed to minimum speed, and then to a normal operating speed to obtain a plurality of motor torque values at various motor speeds. This may occur in periodic intervals or as a single occurrence. Then, during mode two operation, the fluid level determination unit 304 determines the estimated fluid level based on the then motor operating parameters, e.g., motor speed and motor torque. In FIG. 4, a graphical illustration of a waveform of the estimated fluid level 400 (measured in feet over pump or FOP) and a waveform of the actual fluid level 402 (measured in FOP), both as a function of various motor speed 404 and motor torque 406 values are shown. As discussed above, the fluid level determination unit 304 determines the estimated fluid level by comparing the calculated torque of the motor during second mode with the torque obtained for that motor speed during the first mode operation.

If the fluid level in the well 104 drops too low, an undesirable pump-off or gas-lock condition may occur. A pump-off condition occurs when the fluid level in the well 104 drops to a point where the pump inlet no longer receives a steady inflow of mostly liquid fluid from the well 104. Similarly, in a well 104 having gas entrained in the fluid, a gas interference condition may occur when the fluid level has been reduced to such a low level that fluid pressure at the pump inlet falls below a bubble-point of the fluid. As a result, gas is released, which may enter the pump 102. The fluid level determination unit 304 is configured to maintain the fluid level high enough to prevent pump-off or gas lock.

Figure 5A:
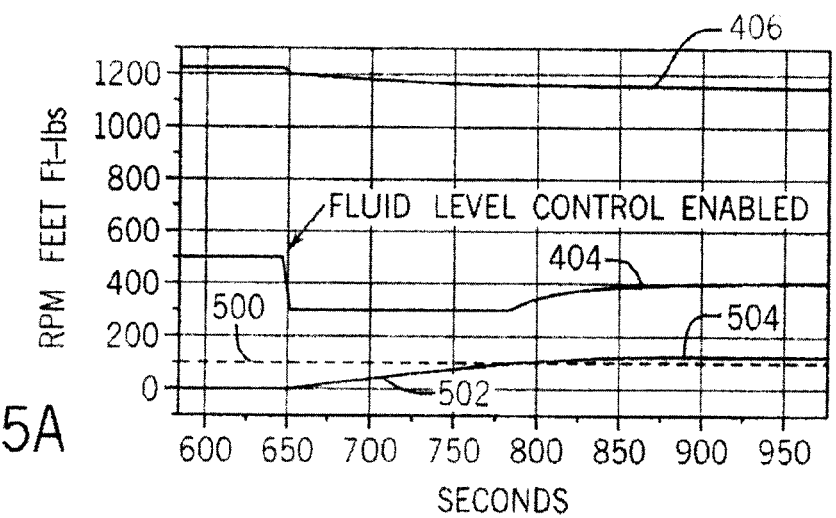
FIGS. 5A, 5B, and 5C are graphs illustrating waveforms that show the results of the operation of the adjustment unit.
Figure 5B:
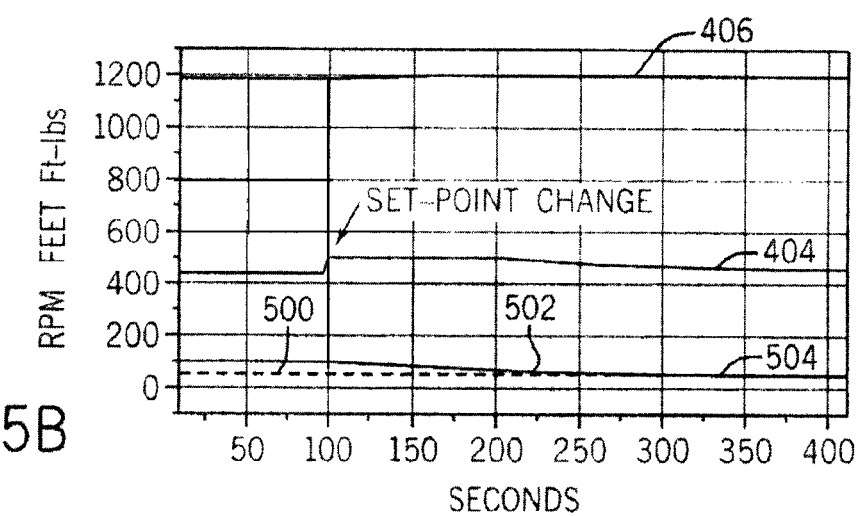
Figure 5C:
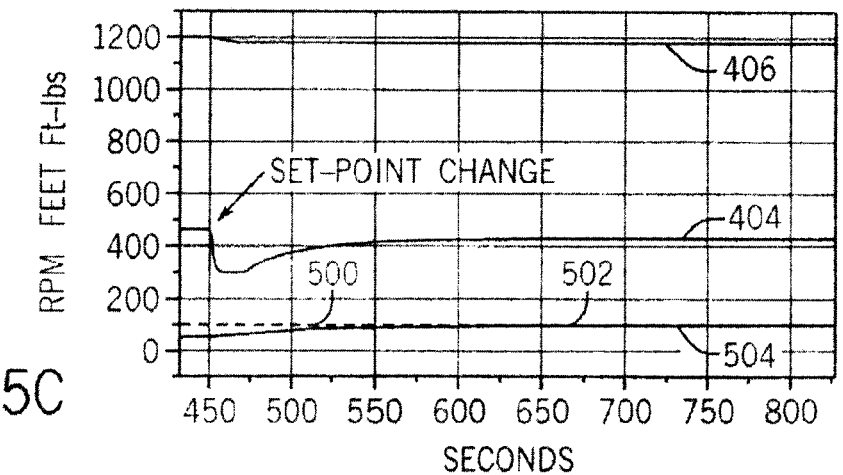

In FIGS. 5A-5C, graphical illustrations of how the adjustment unit controls the relationship of the estimated fluid level to the actual fluid level as the desired fluid level 500 changes are shown. In particular, FIG. 5A shows the estimated fluid level 502 relative to the actual fluid level 504 when the desired fluid level 500 is 100 FOP. FIG. 5B shows the estimated fluid level 502 relative to the actual fluid level 504 when the desired fluid level 500 changes from 100 FOP to 50 FOP. FIG. 5C shows the estimated fluid level 502 relative to the actual fluid level 504 when the desired fluid level 500 changes from 50 FOP to 100 FOP.

Figure 6:
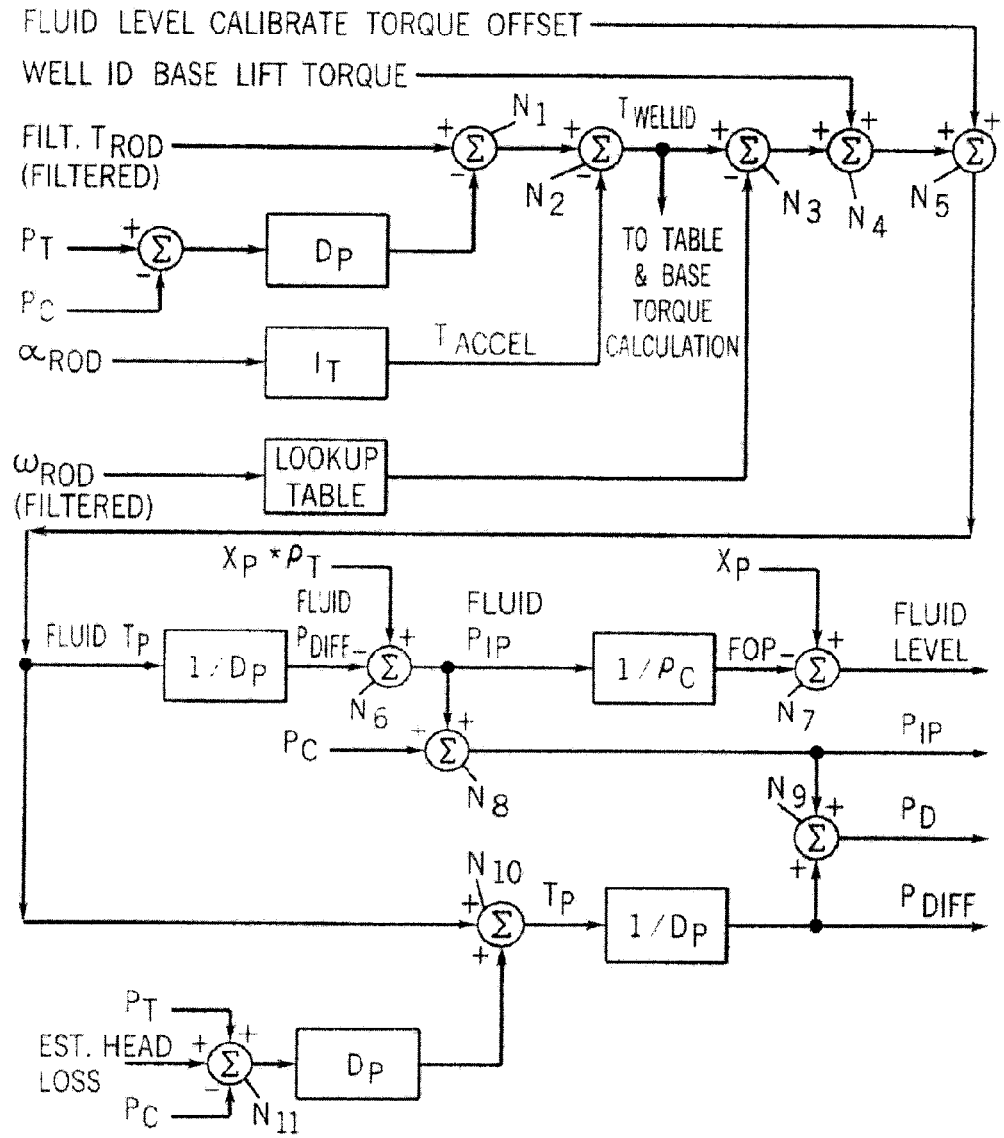
FIG. 6 is a block diagram of an embodiment of the algorithm implemented by the pump controller.

Referring to FIG. 6, the algorithm implemented by the second mode unit 308 to estimate the fluid level.

Prior to $N_1$ is a signal labeled Filt $T_{rod}$. This is surface Rod Torque. Surface Rod Torque equals Motor Torque times surface pumping unit Gear Ratio (and passed through a low-pass filter). Motor torque is determined by motor current and voltage signals.

$N_1$ output of FIG. 6 represents the current surface Rod Torque (Filt $T_{rod}$) decoupled from the effects of tubing and casing pressure. $N_1$ output is surface rod torque minus the quantity [(Tubing Pressure−Casing Pressure)*Pump Displacement].

$N_2$ output represents $N_1$ torque decoupled from the effects of load acceleration and deceleration. $N_2$ output is $N_1$ torque minus Angular Acceleration times Rotary Inertia ($\alpha_{rod}*I_t$). $N_2$ output is called "$T_{well\ id}$," which is the "Well ID Torque." The Well ID Torque is the torque value programmed into the Well ID Lookup Table, populated during the Well ID Test.

The Well ID Torque is also used to determine the Well ID Base Lift Torque. The Well ID Base Lift Torque is the torque required to lift fluid during the Well ID test. In other words, it is the torque required to lift the fluid for the given casing fluid level during the time the Well ID test was performed. Ideally, this value represents only the hydraulic fluid lift torque. (In practice, this value may comprise other friction components, however.) This value is a baseline, albeit practically relative, starting point from which to compare to at a later date, when fluid level is to be determined.

The Well ID Base Lift torque is determined in one of two ways, depending upon whether or not the Well ID test is allowed to run reverse. If the Well ID test is allowed to run reverse, a characteristic referred to as pump Base Friction Torque is determined by taking half of the measured slow forward torque minus the measured slow reverse torque. The Well ID Base Lift Torque is then calculated while running at low speed, by taking the output of $N_2$ minus the Base Friction Torque. (The purpose of this is to decouple the pump coulomb friction from measured pump torque.) If the Well ID is not allowed to run reverse, the pump Base Friction Torque is approximated by using pump bench test data "Rated Lift" and "Torque at Rated Lift." Specifically, pump Base Friction Torque is equal to bench test Torque at Rated Lift minus the theoretical hydraulic fluid torque at Rated Lift. The theoretical hydraulic fluid torque at Rated Lift is calculated by multiplying the pump Rated Lift pressure by the Pump Displacement.

The non-reverse Well ID will suffer from application specific frictions that are not incorporated into the bench test data. On the other hand, the reverse Well ID test may suffer from a changing casing fluid level during the Well ID. (The casing fluid level is assumed to be relatively constant throughout the Well ID.) Because of these errors, it may be necessary for the fluid level to be calibrated, possibly using a portable acoustical device. As the pump wears with time, periodic re-calibration may also be necessary (perhaps on the order of once or twice a year).

$N_3$ is the difference between the current Well ID Torque and the value from the Lookup Table for the current operational speed. In other words, its output is the difference between the current torque and the Lookup Table torque corresponding to the current speed. If, for example, the current casing fluid level is the same as when the Well ID table was built, the output of $N_3$ will be effectively zero (at any speed). From this the reader can see the achievement of decoupling from velocity and corresponding ancillary effects such as viscous pump and fluid friction.

$N_4$ is the summation of $N_3$ output with the previously discussed Well ID Base Lift Torque. $N_4$ output ideally represents the torque required to lift the fluid for the current casing fluid level (hydraulic lift torque only), but in practice may be offset somewhat by unidentified torque components such as rod or pump friction errors within the Well ID Base Lift Torque value.

$N_5$ output represents the torque necessary to lift the fluid for the current casing fluid level (hydraulic lift torque only), referred to as Pump Fluid Torque (Fluid $T_p$). $N_5$ is the summation of $N_4$ output with a Fluid Level Calibration Torque Offset. The Fluid Level Calibration Torque Offset is determined at the time of a fluid level calibration (such as with a portable acoustical device), and is used to compensate for the possible offset resulting from unidentified torque components mentioned in the previous paragraph. The fluid level calibration torque offset may be necessary if the Well ID test was not allowed to run reverse, resulting in errors in the Well ID Base Lift Torque (as calculated from pump bench test data, which does not include rod and flow friction terms).

Just prior to $N_6$, the Fluid Pump Torque is divided by the Pump Displacement, resulting in the differential pump pressure required to lift the fluid only, labeled Fluid $P_{diff}$. $N_6$ is the quantity [Pump Depth ($X_p$) times Tubing Fluid Density ($\rho t$)] minus Fluid Pdiff. $N_6$ output represents the pump intake pressure component resulting solely from the weight of the casing fluid height, labeled Fluid Pip.

Just prior to $N_7$, the Fluid $P_{ip}$ is divided by the Casing Fluid Density ($\rho c$). The result is the casing fluid level over the pump, labeled FOP. $N_7$ is the subtraction of FOP from Pump Depth ($X_p$), representing fluid level from surface. One ordinarily skilled in the art of PCP control will understand the concept of the disclosure, that any difference between the current rod torque and the table torque for the current speed is attributed to a change in casing fluid level relative to that during the Well ID, thereby allowing the current fluid level to be determined. The fluid level estimate is now complete.

It may be desirable to alternately express the casing fluid level over the pump as the pump intake pressure. $N_8$ is the summation of Fluid Pip and casing pressure ($P_c$), yielding Pump Intake Pressure, $P_{ip}$.

It is also possible for the controller to estimate actual pump discharge pressure as well as actual pump differential pressure. This is accomplished with the blocks associated with $N_{9,10,11}$ of FIG. 6.

$N_{11}$ is the summation of terms in a method (not described herein) for estimating the head loss associated with the tubing flow friction. Coupled with the tubing and casing pressures, $N_{11}$ output represents the pressure required to overcome these effects. This pressure is multiplied by Pump Displacement to obtain the equivalent torque. At $N_{10}$, that equivalent torque is summed with the Pump Fluid Torque to obtain the estimated Actual Pump Torque ($T_p$). The result is divided by the Pump Displacement, resulting in the estimated actual pump differential pressure ($P_{diff}$). $N_9$ is the summation of Pump Intake Pressure and Pump Differential Pressure, yielding the estimated actual Pump Discharge pressure ($P_d$).

The various parameter inputs and derived outputs used to determine the fluid level in the wellbore are expressed as follows:

$$\text{Filt } T_r = T_m * G_r$$

where, Filt $T_r$=Filtered Rod Torque; $T_m$=Motor Torque; $G_r$=Gear Ratio
Rod Torque is determined by multiplying Motor Torque by Gear Ratio $$\text{Fluid } T_p = (\text{Filt } T_r - ((P_t - P_c)*D_p)) - \text{Table Torque}$$

where, Fluid $T_p$=Fluid Pump Torque; $P_t$=Tubing Pressure; $P_c$=Casing Pressure;
   $D_p$=Pump Displacement=Pump Base Flow/Pump Base Speed
   Table Torque=Table torque value for current speed
The quantity {(Tubing Pressure−Casing Pressure)*Pump Displacement} is subtracted from Rod Torque and the Well ID lookup table torque value (corresponding to the present speed) is subtracted from that value.

$$\text{Fluid } P_{diff} = \text{Fluid } T_p / D_p$$

where, Fluid $P_{diff}$=Fluid Pump Differential Pressure; Fluid $T_p$=Fluid Pump Torque;
   $D_p$=Pump Displacement=Pump Base Flow/Pump Base Speed
Fluid Pump Torque is divided by Pump Displacement to derive Fluid Pump Differential Pressure. Note that Fluid Pump Differential Pressure is decoupled from friction and tubing/casing pressure, and represents the pressure resulting purely from fluid load.

$$\text{Fluid } P_{pip} = (X_p * \rho_t) - \text{Fluid } P_{diff}$$

where, Fluid $P_{ip}$=Fluid Pump Intake Pressure; $X_p$=Pump Depth; $\rho_t$=Tubing Fluid Density Fluid Differential Pressure is subtracted from tubing fluid column load pressure (Pump Depth times Tubing Fluid Density) to derive Fluid Pump Intake Pressure.

$$P_{ip}=P_c+\text{Fluid }P_{ip}$$

where, $P_{ip}$=Pump Intake Pressure; $P_c$=Casing Pressure; Fluid $P_{ip}$=Fluid Pump Intake Pressure Casing Pressure is added to Fluid Differential Pressure, resulting in Pump Intake Pressure.

$$F_{OP}=P_{ip}/\rho_c$$

where, $F_{OP}$=Casing Fluid Level Over Pump; $P_{ip}$=Pump Intake Pressure;
$\rho_c$=Casing Fluid Density Fluid Pump Intake Pressure is divided by Casing Fluid Density, resulting in Casing Fluid Level Over Pump.

$$\text{Fluid Level}=X_p-F_{OP}$$

where, $X_p$=Pump Depth; $F_{OP}$=Casing Fluid Level Over Pump Casing Fluid Level Over Pump is subtracted from Pump Depth, resulting in Casing Fluid Level From Surface.

Figure 7A:
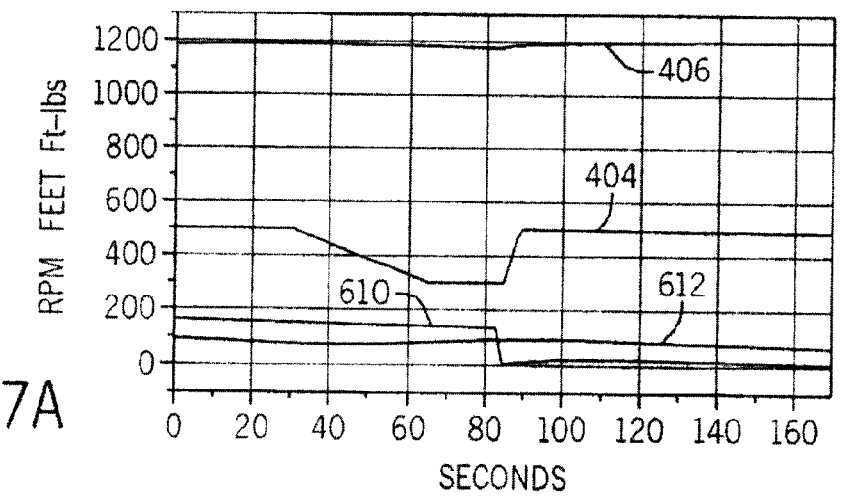
FIGS. 7A, 7B, and 7C are graphs illustrating waveforms that show the relationship of the estimated fluid level to the actual fluid level during (7A) and after (7B, 7C) a first mode of operation.
Figure 7B:
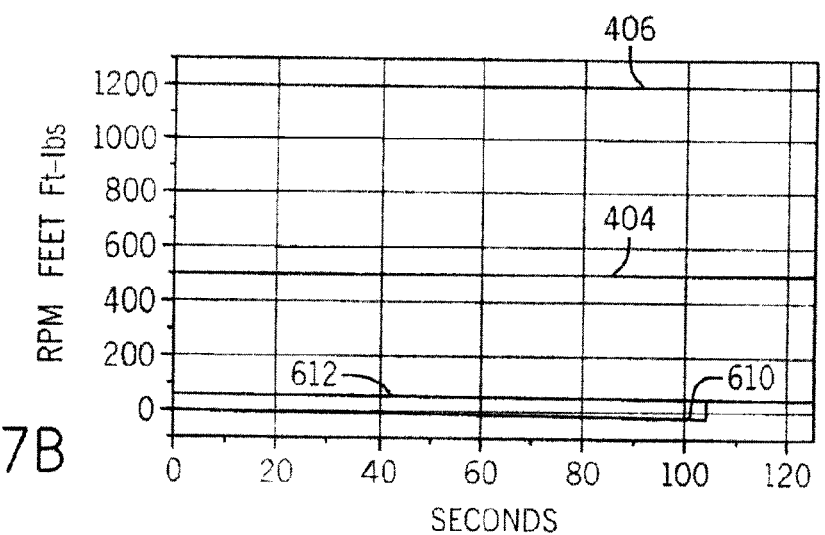
Figure 7C:
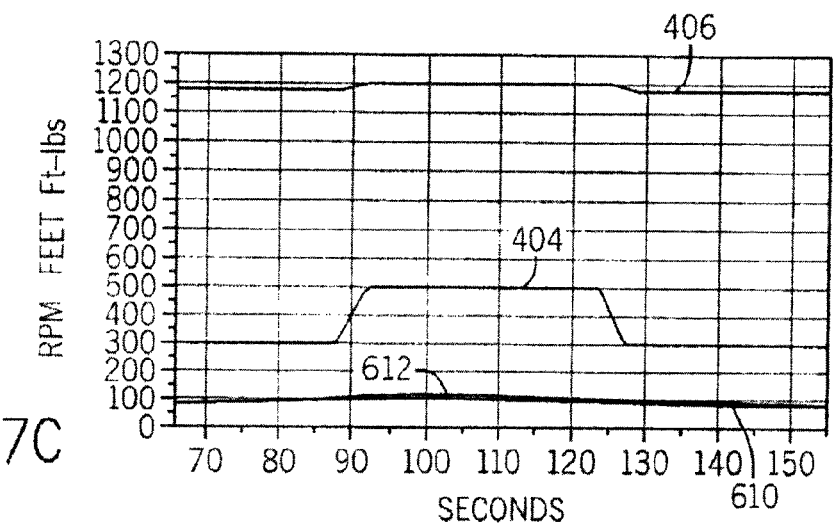

FIGS. 7A, 7B, and 7C show graphical illustrations of the relationship of the estimated fluid level to the actual fluid level after the first mode of operation only in which pump friction has not been identified. As shown in FIG. 7A, a waveform of the estimated fluid level 610 is shown to be approximately 80 feet below a waveform of the actual fluid level 612 immediately after mode one Well ID. Therefore, level calibration is required to obtain a more accurate estimation of fluid level. FIG. 7B shows a waveform of the estimated fluid level 610 relative to a waveform of the actual fluid level 612 after the first mode of operation and after level calibration have been performed. As shown, the waveform of the estimated fluid level 610 is the same as or nearly the same as the waveform of the actual fluid level 612. FIG. 7C shows the results of the calibration operation of FIG. 7B over a period of time in which motor speed 404 is ramped up and down.

Figure 8A:
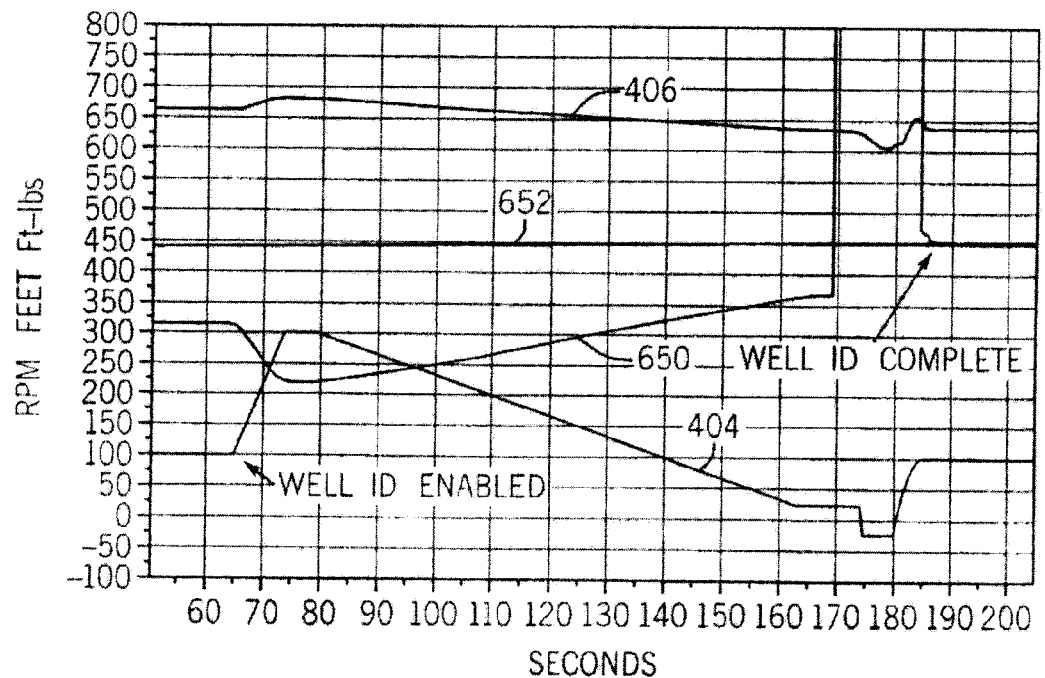
FIGS. 8A and 8B are graphs illustrating waveforms that show the relationship of the estimated fluid level to the actual fluid level during (8A) and after (8B) the first mode of operation.
Figure 8B:
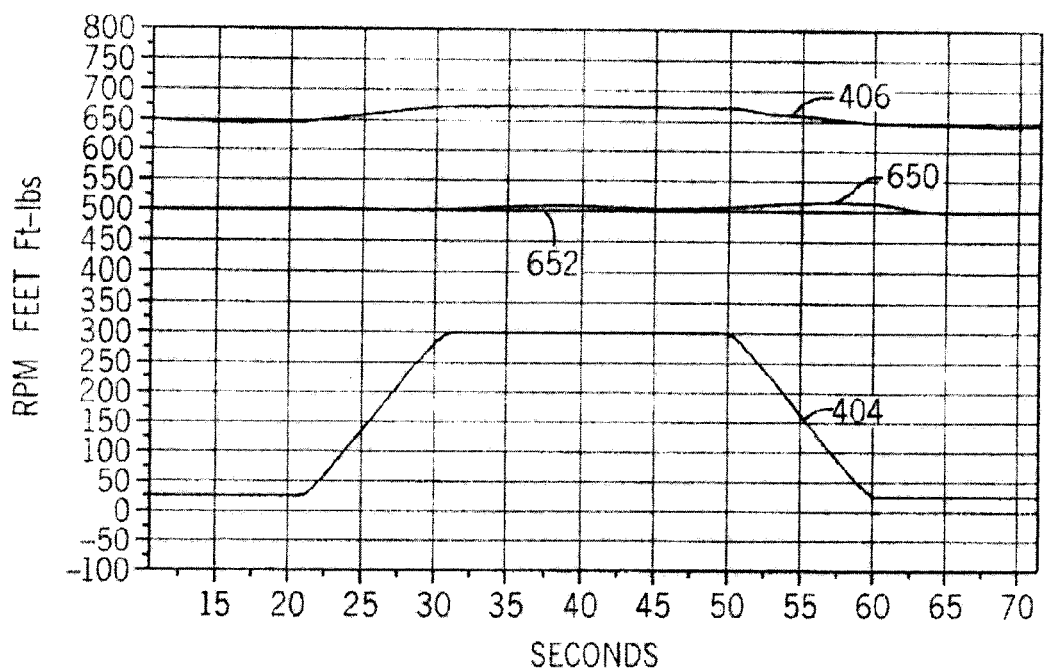

On the other hand, FIGS. 8A and 8B are graphs illustrating waveforms that show the relationship of the estimated fluid level to the actual fluid level during and after the first mode of operation in which pump friction has also been identified. FIG. 8A shows a waveform of the estimated fluid level 650 relative to the actual fluid level 652 after operation of the first mode with reverse pump rotation to identify friction. FIG. 8B shows the results of the operations of FIG. 8A over a period of time in which motor speed 404 is ramped up and down. As a result of operating the pump 102 in a first mode of operation in which a friction value is determined, level calibration is not required to obtain an accurate estimation of fluid level.

All references, including publications, patent applications, and patents cited herein are hereby incorporated by reference to the same extent as if each reference were individually and specifically indicated to be incorporated by reference and were set forth in its entirety herein.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

The use of the terms "a" and "an" and "the" and similar referents in the context of describing the pumping system (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the features of the disclosure and does not pose a limitation on the scope of the disclosure unless otherwise claimed. No language in the specification should be construed as indicating any non-claimed element as essential to the practice of the disclosed pumping system.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed:

1. A pumping system, comprising:
   a pump configured to control a level of fluid over pump in a well;
   a motor operably coupled to the pump and configured to drive the pump;
   a controller operably coupled to the motor and configured to control operation of the pump, the controller comprising:
   a motor determination unit configured to determine motor operating parameters of a motor configured to control a pump in a well, said motor operating parameters comprising motor torque and motor speed;
   a pump determination unit operably coupled to the motor determination unit and configured to determine pump operating parameters based on at least one motor operating parameter, a pump operating parameter comprising one of a pump torque and a pump speed;
   a fluid level determination unit operably coupled to the pump determination unit and configured to determine an estimated fluid over pump level in the well;
   said fluid determination unit comprising a first mode unit configured to generate first mode output data based on operation of the pump in a first mode, including pump speed and pump torque values associated with an identified specific fluid-over-pump value; and
   said fluid determination unit further comprising a second mode unit operably coupled to the first mode unit, wherein the second mode unit is configured to operate the pump in an operational mode in a production manner to determine an estimated fluid over pump level at current speed and toque values of the pump; and wherein the fluid determination unit uses the values of pump speed, pump torque, and specific fluid over pump value obtained in the first mode unit and the current values of pump speed and pump torque obtained in the second mode unit to calculate a current fluid over pump.

2. The pumping system of claim 1, wherein the motor operating parameter comprises one of a motor torque and a motor speed.

3. The pumping system of claim 1, wherein the fluid level determination unit ramps the motor to a predetermined speed to determine the estimated fluid over pump level in the well.

4. The pumping system of claim 1, wherein the first mode unit operates the pump based on one of a Proportional-Integral-Derivative (PID) function and a Proportional-Integral (PI) function.

5. The pumping system of claim 1, wherein the second mode unit operates the pump in an operational mode and obtains pump speed and torque values.

6. The pumping system of claim 1, wherein the pump determination unit is further configured to determine an estimated friction value including a pump coulomb friction value.

7. The pumping system of claim 1, wherein the pump comprises a rotationally driven pump.

8. The pumping system of claim 1, wherein both the first mode unit and the second mode unit control one of a pump speed and a pump rotation direction.

9. The pumping system of claim 1, wherein the pump is a progressing cavity pump.

10. The pumping system of claim 1, further comprising:
an adjustment unit operably coupled to the fluid level determination unit, the adjustment unit configured to adjust the pump speed to maintain the estimated fluid over pump level at a predetermined setpoint value.

11. The pumping system of claim 1, wherein the pump speed and pump torque values associated with the specific fluid-over pump value are stored in a mapping database coupled to the controller.

12. A pump controller, comprising:
a motor determination unit configured to determine motor operating parameters of a motor configured to control a pump in a well, said motor operating parameters comprising motor torque and motor speed;
a pump determination unit operably coupled to the motor determination unit and configured to determine pump operating parameters based on at least one motor operating parameter, said pump operating parameters comprising pump torque and pump speed;
a fluid level determination unit operably coupled to the pump determination unit and configured to determine an estimated fluid over pump level in the well;
said fluid determination unit comprising a first mode unit configured to generate first mode output data based on operation of the pump in a first mode, including pump speed and pump torque values associated with an identified specific fluid-over-pump value; and
said fluid determination unit further comprising a second mode unit operably coupled to the first mode unit, wherein the second mode unit is configured to operate the pump in an operational mode in a production manner to determine an estimated fluid over pump level at current speed and toque values of the pump; and
wherein the fluid determination unit uses the values of pump speed, pump torque, and specific fluid over pump value obtained in the first mode unit and the current values of pump speed and pump torque obtained in the second mode unit to calculate a current fluid over pump.

13. The pump controller of claim 12, wherein the motor operating parameter comprises one of a motor torque and a motor speed.

14. The pump controller of claim 12, wherein the pump operating parameter comprises one of a pump speed and a pump torque.

15. The pump controller of claim 12, wherein the fluid level determination unit ramps the motor to a predetermined speed to determine the estimated fluid over pump level in the well.

16. The pump controller of claim 12, wherein the first mode unit operates the pump based on one of a Proportional-Integral-Derivative (PID) function and a Proportional-Integral (PI) function.

17. The pump controller of claim 12, wherein the second mode unit operates the pump in an operation manner and obtains pump speed and torque values.

18. The pump controller of claim 12, wherein the pump determination unit is further configured to determine an estimated friction value including a pump coulomb friction value.

19. The pump controller of claim 12, wherein the pump comprises a rotationally driven pump.

20. The pump controller of claim 19, wherein the rotationally driven pump is a progressing cavity pump.

21. The pump controller of claim 12, further comprising:
an adjustment unit operably coupled to the fluid level determination unit, the adjustment unit configured to adjust the pump speed to maintain the estimated fluid over pump level at a predetermined setpoint value.

22. The pump controller of claim 21, wherein the predetermined setpoint value is fixed by an operator of the pump controller to a desired fluid over pump level.

23. The pump controller of claim 12, wherein the pump speed and pump torque values associated with the specific fluid-over pump value are stored in a mapping database coupled to the controller.

* * * * *